United States Patent
Hammad et al.

(10) Patent No.: US 11,796,699 B2
(45) Date of Patent: Oct. 24, 2023

(54) SYSTEM AND METHODS FOR DETERMINING A CONVERTED WAVE ATTENUATED VERTICAL SEISMIC PROFILE OF A HYDROCARBON RESERVOIR

(71) Applicant: SAUDI ARABIAN OIL COMPANY, Dhahran (SA)

(72) Inventors: Hussain I. Hammad, Tarut (SA); Weihong Zhu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 170 days.

(21) Appl. No.: 17/410,910

(22) Filed: Aug. 24, 2021

(65) Prior Publication Data
US 2023/0065746 A1    Mar. 2, 2023

(51) Int. Cl.
*G01V 1/28* (2006.01)
*G01V 1/34* (2006.01)
*E21B 41/00* (2006.01)

(52) U.S. Cl.
CPC .............. *G01V 1/284* (2013.01); *E21B 41/00* (2013.01); *G01V 1/345* (2013.01);
(Continued)

(58) Field of Classification Search
CPC .................. G01V 1/284; G01V 1/345; G01V 2210/1295; G01V 2210/32; G01V 2210/65; G01V 2210/1429; E21B 41/00
See application file for complete search history.

(56) References Cited

U.S. PATENT DOCUMENTS

| 4,870,580 A | 9/1989 | Lang et al. |
| 6,651,007 B2 | 11/2003 | Ozbek |

(Continued)

FOREIGN PATENT DOCUMENTS

| CN | 101246218 B | 6/2010 |
| CN | 112946732 A | 6/2021 |
| WO | 2017/024112 A1 | 2/2017 |

OTHER PUBLICATIONS

Igor Morozov, "Vertical Seismic Profiling", Mar. 23, 2012, GEOL Publishing, pp. 1-11 (Year: 2012).*

(Continued)

*Primary Examiner* — Elias Desta
(74) *Attorney, Agent, or Firm* — Osha Bergman Watanabe & Burton LLP

(57) ABSTRACT

A method of determining a shear-wave attenuated vertical component vertical seismic profile (VSP) dataset is disclosed. The method includes, obtaining a multi-component VSP dataset, including a vertical and a horizontal component, transforming the vertical component into a vertical spectrum and the horizontal component into a horizontal spectrum, and designing a band-pass filter based, at least in part, on an energetic signal of the horizontal spectrum. The method further includes determining a muted vertical amplitude spectrum by applying the pass-band filter to an amplitude spectrum of the vertical spectrum, determining an estimated noise model based on the muted vertical amplitude spectrum and the vertical spectrum; and determining the shear-wave attenuated vertical component VSP dataset by adaptively subtracting the estimated noise model from the vertical component of the multi-component VSP dataset. A system including a seismic source, a plurality of seismic receivers, and a seismic processor for executing the method is disclosed.

20 Claims, 10 Drawing Sheets

(52) U.S. Cl.
CPC ............... *G01V 2210/1295* (2013.01); *G01V 2210/1429* (2013.01); *G01V 2210/32* (2013.01); *G01V 2210/65* (2013.01)

(56) References Cited

U.S. PATENT DOCUMENTS

| | | | |
|---|---|---|---|
| 7,286,938 | B2 | 10/2007 | Amundsen et al. |
| 8,208,341 | B2 | 6/2012 | Haldorsen et al. |
| 8,325,559 | B2 | 12/2012 | Hardage |
| 8,902,700 | B2 | 12/2014 | Muyzert et al. |
| 10,310,118 | B2 | 6/2019 | Willis |
| 10,788,596 | B2 | 9/2020 | Amundsen et al. |
| 2012/0269035 | A1 | 10/2012 | Foley |
| 2014/0334262 | A1* | 11/2014 | Brune .................... G01V 1/003 367/86 |
| 2016/0178772 | A1 | 6/2016 | Carter |
| 2020/0025959 | A1 | 1/2020 | Andersson et al. |
| 2020/0292724 | A1 | 9/2020 | Boiero et al. |

OTHER PUBLICATIONS

Hinds, Ronald C. et al., "VSP Interpretive Processing: Theory and Practice"; Society of Exploration Geophysicists: Open File Publications No. 3; pp. iii-205; Jun. 1, 1996 (214 pages).

Hu, Liang-Zie et al., "Wave-field transformations of vertical seismic profiles"; Geophysics; vol. 52, Issue 3; pp. 307-321; Mar. 1987 (15 pages).

Esmersoy, Cengiz, "Inversion of P and SV waves from multicomponent offset vertical seismic profiles"; Geophysics; vol. 55, Issue 1; pp. 39-50; Jan. 1990 (12 pages).

Leaney, W. Scott et al., "Parametric Wavefield Decomposition and Applications"; SEG Technical Program Expanded Abstracts 1990; pp. 1097-1100; Jan. 1990 (4 pages).

Chopra, Satinder et al., "New VSP wavefield separation methods"; Proceedings of the 2004 Canadian Society of Exploration Geophysicists National Convention: Great Explorations—Canada and Beyond; pp. 1-5; 2004 (5 pages).

Palacios, Nestor et al., "Efficient Wavefield Separation for Large 3DVSPs in Saudi Arabia"; Proceedings of the Second EAGE Workshop on Borehole Geophysics; Apr. 21-24, 2013 (4 pages).

Blias, Emil, "VSP wavefield separation: Wave-by-wave optimization approach"; Geophysics; vol. 72, Issue 4; pp. T47-T55; Jul. 2007 (9 pages).

Gao, Lei et al., "Zero-Offset VSP Wavefield Separation Using Two-Step SVD Method"; Proceedings of the 2012 IEEE International Geoscience and Remote Sensing Symposium; pp. 4407-4409; Jul. 22-27, 2012 (3 pages).

Li, Yunyue Elita et al., "Phase and amplitude tracking for seismic event separation"; Geophysics; vol. 80, Issue 6; pp. WD59-WD72; Sep. 1, 2015 (14 pages).

Verschuur, D. J. et al., "Adaptive surface-related multiple elimination"; Geophysics; vol. 57, Issue 9; pp. 1166-1177; Sep. 1992 (12 pages).

Abma, Ray et al., "Comparisons of adaptive subtraction methods for multiple attenuation"; The Leading Edge; vol. 24, Issue 3; pp. 277-280; Mar. 2005 (4 pages).

Leaney, W. Scott P. et al., "Parametric Decomposition of Offset VSP Wave Fields"; SEG Technical Program Expanded Abstracts 1989; pp. 26-29; Jan. 1989 (4 pages).

Hennings, Jan et al., "Wireline distributed acoustic sensing allows 4.2 km deep vertical seismic profiling of the Rotliegend 150° C. geothermal reservoir in the North German Basin"; Solid Earth; vol. 12, Issue 2; pp. 521-537; Feb. 25, 2021 (17 pages).

\* cited by examiner

SYSTEM AND METHODS FOR DETERMINING A CONVERTED WAVE ATTENUATED VERTICAL SEISMIC PROFILE OF A HYDROCARBON RESERVOIR

BACKGROUND

Vertical seismic profiles (VSPs) are frequently acquired in wellbores penetrating hydrocarbon reservoirs by engineers and geoscientists in the oil and gas industry. VSPs are used to characterize and image reservoir structure in the vicinity of the wellbore and to convert surface seismic data acquired over the reservoirs from seismic recording time to depth below the surface.

VSPs are recorded using a surface seismic source and a plurality of borehole seismic receivers. Typically, the borehole seismic receivers are multi-component seismic receivers capable of detecting vertical and horizontal vibrations resulting from the propagation of seismic waves from the seismic source to the seismic receivers. Further, VSPs may detect both compressional waves, often termed pressure, primary or P-waves, and shear waves, often termed secondary or S-waves.

When processing a VSP dataset, it is frequently desirable to separate the vibrations caused by P-waves from the vibrations caused by S-waves and to process each separately.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method of determining a shear-wave attenuated vertical component vertical seismic profile (VSP) dataset. The method includes, obtaining a multi-component VSP dataset, including a vertical and a horizontal component, transforming the vertical component into a vertical spectrum and the horizontal component into a horizontal spectrum, and designing a band-pass filter based, at least in part, on an energetic signal of the horizontal spectrum. The method further includes determining a muted vertical amplitude spectrum by applying the pass-band filter to an amplitude spectrum of the vertical spectrum, determining an estimated noise model based on the muted vertical amplitude spectrum and the vertical spectrum; and determining the shear-wave attenuated vertical component VSP dataset by adaptively subtracting the estimated noise model from the vertical component of the multi-component VSP dataset.

In general, in one aspect, embodiments relate to a non-transitory computer readable medium storing instructions executable by a computer processor. The instructions include functionality for receiving a multi-component VSP dataset, including a vertical and a horizontal component, transforming the vertical component into a vertical spectrum and the horizontal component into a horizontal spectrum, and designing a band-pass filter based, at least in part, on an energetic signal of the horizontal spectrum. The instructions further include functionality for determining a muted vertical amplitude spectrum by applying the pass-band filter to an amplitude spectrum of the vertical spectrum, determining an estimated noise model based on the muted vertical amplitude spectrum and the vertical spectrum; and determining the shear-wave attenuated vertical component VSP dataset by adaptively subtracting the estimated noise model from the vertical component of the multi-component VSP dataset.

In general, in one aspect, embodiments relate to a system including a seismic source, a plurality of multicomponent borehole seismic receivers for detecting a seismic wave generated by the seismic source, and a seismic processor. The seismic processor is configured to receive a multi-component VSP dataset, including a vertical and a horizontal component, transform the vertical component into a vertical spectrum and the horizontal component into a horizontal spectrum, and design a band-pass filter based, at least in part, on an energetic signal of the horizontal spectrum. The seismic processor is further configured to determine a muted vertical amplitude spectrum by applying the pass-band filter to an amplitude spectrum of the vertical spectrum, determine an estimated noise model based on the muted vertical amplitude spectrum and the vertical spectrum; and determine the shear-wave attenuated vertical component VSP dataset by adaptively subtracting the estimated noise model from the vertical component of the multi-component VSP dataset.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is frequently desirable to determine P-wave only VSP datasets for the purposes of imaging hydrocarbon reservoirs or for converting surface seismic datasets from the time domain to the depth domain. In these circumstances S-waves, including converted S-waves, constitute unwanted noise. Described below are methods and systems for estimating and removing S-wave contamination from vertical component VSP datasets.

Figure 1:
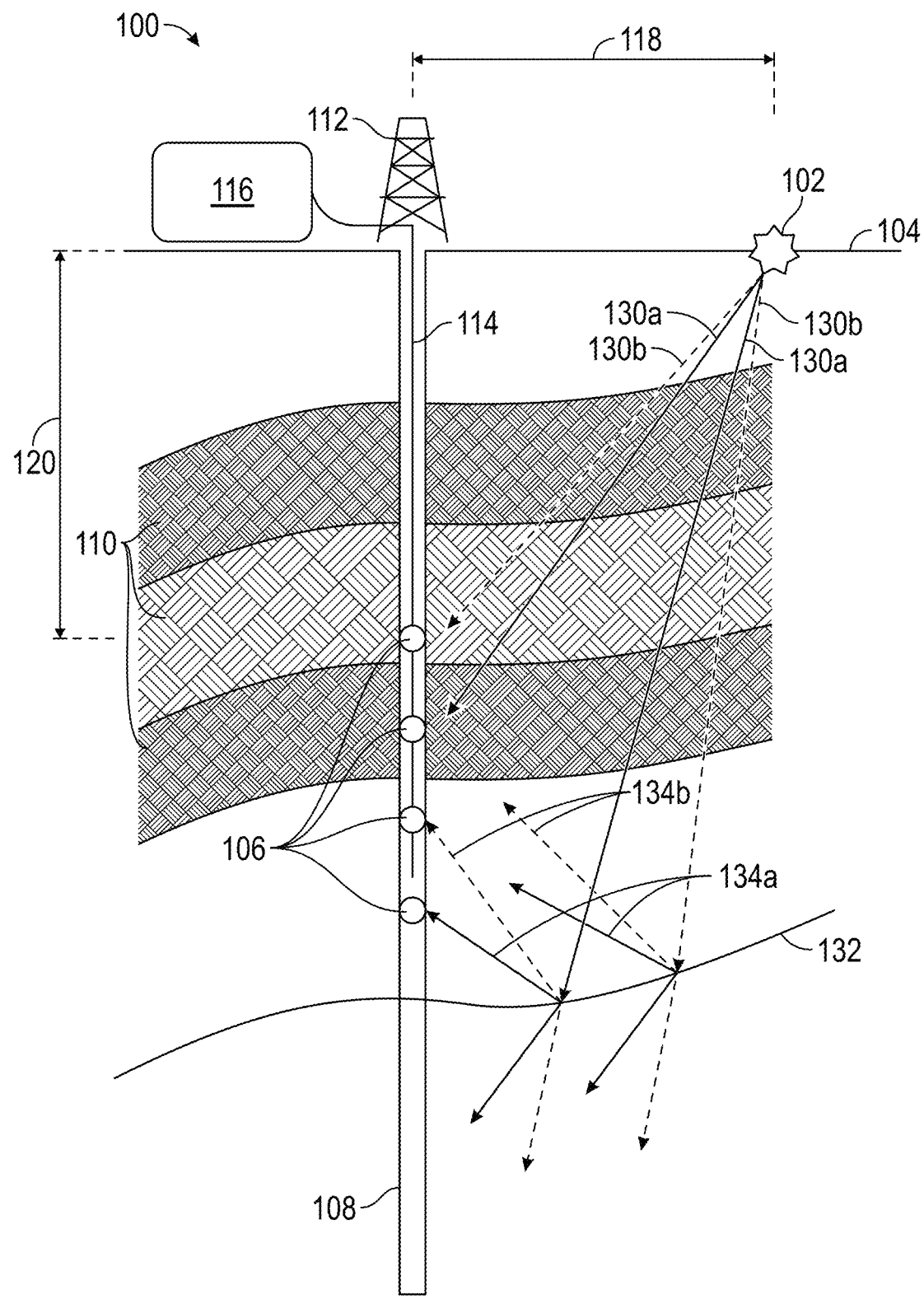
FIG. 1 depicts a VSP recording geometry in accordance with one or more embodiments.

FIG. 1 depicts a VSP recording geometry (100) in accordance with one or more embodiments. Unlike surface seismic datasets, which are acquired using a plurality of seismic sources and seismic receivers located on the earth's surface, a borehole seismic survey typically has one or more seismic source (102) on the surface (104) and a plurality of seismic receivers (106) located in a wellbore (108) that may penetrate a plurality of geological layers (110) in the subsurface region of interest. The plurality of seismic receivers (106) may be suspended from a derrick (112) or a crane (not shown) using a means of conveyance (114). The means of conveyance may be a wireline cable, fiber optic cable, coil tubing, drill pipe, wired drill pipe, or any other conveyance mechanism as would be understood by one of ordinary skill in the art. In addition to providing mechanical support to the plurality of seismic receivers (106) in the wellbore (108), the means of conveyance (114) may provide electrical power to the plurality of seismic receivers (106) or transmit data recorded by the plurality of seismic receivers (106) to a recording facility (116) on the surface (104), or both provide power and transmit data. In operation on land the recording facility (116) may be mounted in a truck. In operation at sea the recording facility (116) may be part of a drilling rig, production platform, or ship (not shown). When the plurality of seismic receivers (106) are deployed into the wellbore the length of cable unspooled may be monitored, thus the depth of each of the seismic receivers (106) may be known at any time with a high level of certainty. In particular, the depth of each of the seismic receivers (106) may be known at the time at which a VSP dataset is recorded with a high level of certainty. Frequently, seismic sources may be located at a distance (118) from the derrick (112) or crane, and the seismic receivers may be located at a depth (120). Often the depth (120) is much greater than the distance (118), but this may not always be the case.

When the seismic source (102) is excited, seismic waves (130a, 130b) radiate from the seismic source (102) and may propagate from the seismic source (102) directly to the plurality of seismic receivers (106) where they are recorded. In addition, seismic waves may be reflected from geological discontinuities (132) and these reflected seismic waves (134a, 134b) may be recorded by the plurality of seismic receivers (106). Some of the seismic waves radiating away from the seismic source may be P-waves (130a) and others may be S-waves (130b). Similarly, some of the seismic waves reflected from a geological discontinuity (132) may be P-waves (134a) and others may be S-waves (134b). Seismic P-waves (130a) incident on the geological discontinuity (132) may be reflected as P-waves (134a) or may be reflected as S-waves (134b). Similarly, seismic S-waves (130b) incident on the geological discontinuity (132) may be reflected as P-waves (134a) or may be reflected as S-waves (134b).

Each seismic receiver (106) detects and records the vibrations caused by seismic waves as a time series or "trace". Each sample of the trace records the amplitude of the vibration caused by seismic waves at the time the sample is taken. The amplitudes may have positive or negative values at different times along the trace. A multicomponent seismic receiver records one trace for each component. Thus, a three-component seismic receiver will produce three traces each measuring displacement in a mutually perpendicular direction.

Figure 2A:
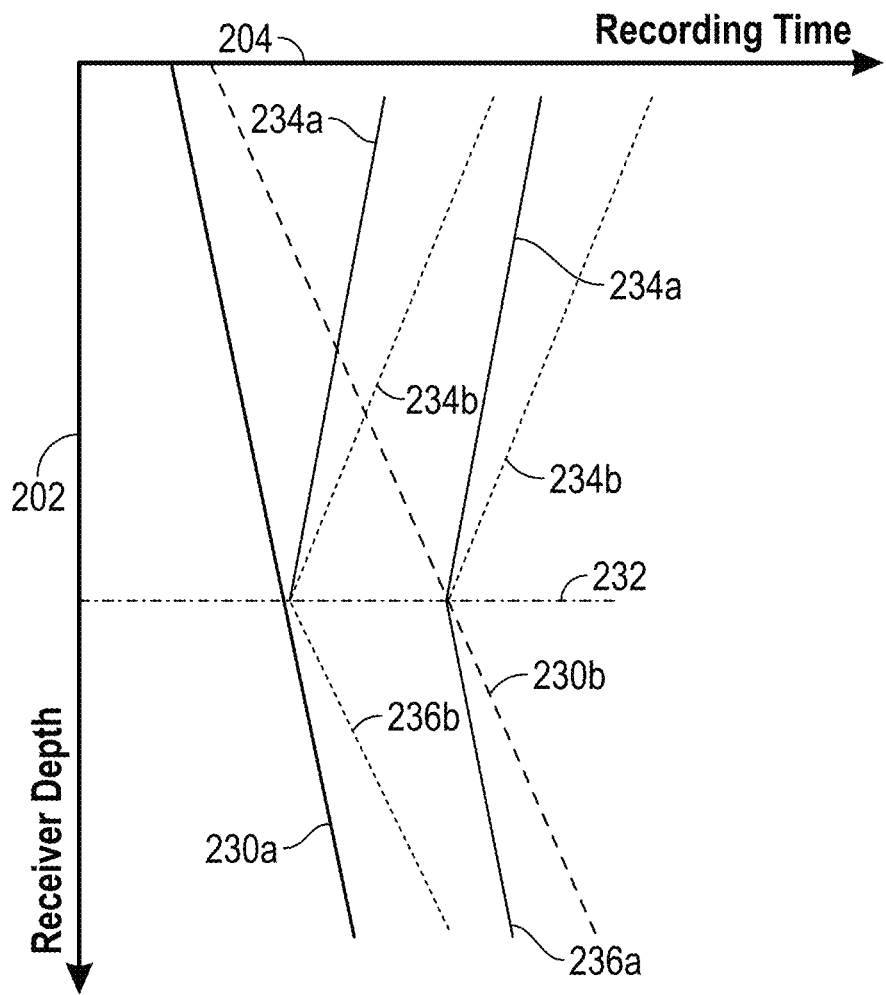
FIG. 2A depicts the arrival times of seismic waves at seismic receivers located at different depths in accordance with one or more embodiments.

FIG. 2A schematically depicts the arrival time of seismic waves at seismic receivers located at different depths in a VSP dataset, in accordance with one or more embodiments. Seismic receiver depth is indicated on the vertical axis (202) and recording time is indicated on the horizontal axis (204). Generally, P-waves travel faster than S-waves, thus at any depth the P-wave arrival times (230a) are earlier than the S-wave arrival times (23b). When a P-wave (230a) impinges on a geological discontinuity at a depth (232) it may generate a transmitted S-wave (236b), a reflected P-wave (234a), and a reflected S-wave (234b). Similarly, when an S-wave (230b) impinges on a geological discontinuity at a depth (232) it may generate a transmitted P-wave (236a), a reflected P-wave (234a), and a reflected S-wave (234b).

Figure 2B:
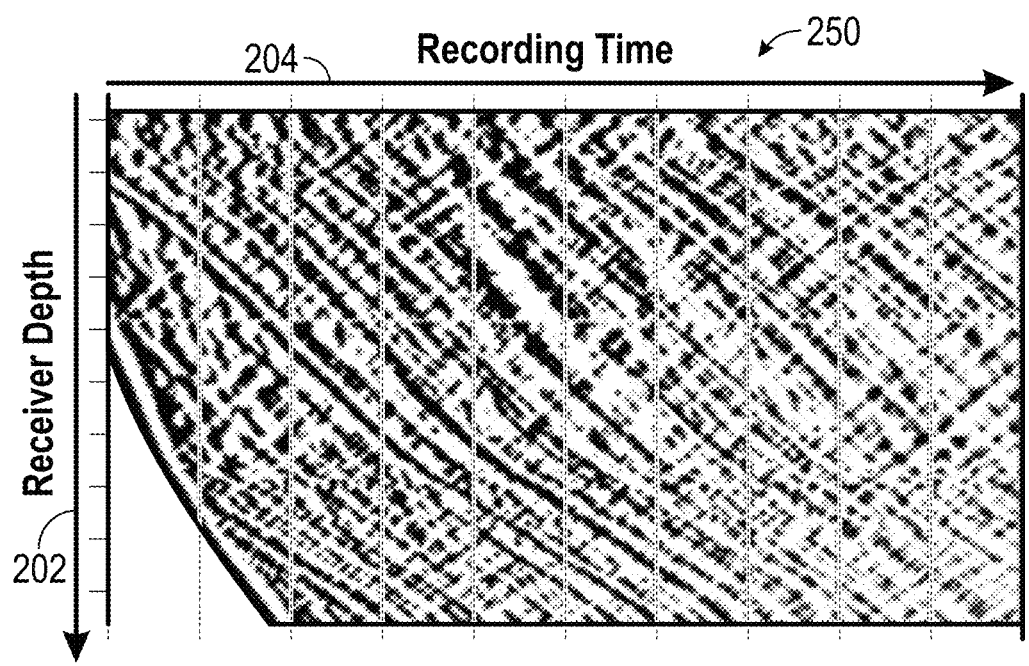
FIG. 2B shows a time-space domain VSP dataset in accordance with one or more embodiments.

FIG. 2B shows a time-space domain VSP dataset (250), in accordance with one or more embodiments. In FIG. 2B each recorded trace is displayed horizontally on a grayscale with the recording time indicated on the horizontal axis (204). The depth of the seismic receiver that recorded the trace is indicated on the vertical axis (202). In some embodiments, darker gray shades may indicate positive amplitude and lighter gray shades negative amplitude, while in other embodiments lighter grad shades may indicate positive amplitude and darker gray shades negative amplitude.

Figure 2C:
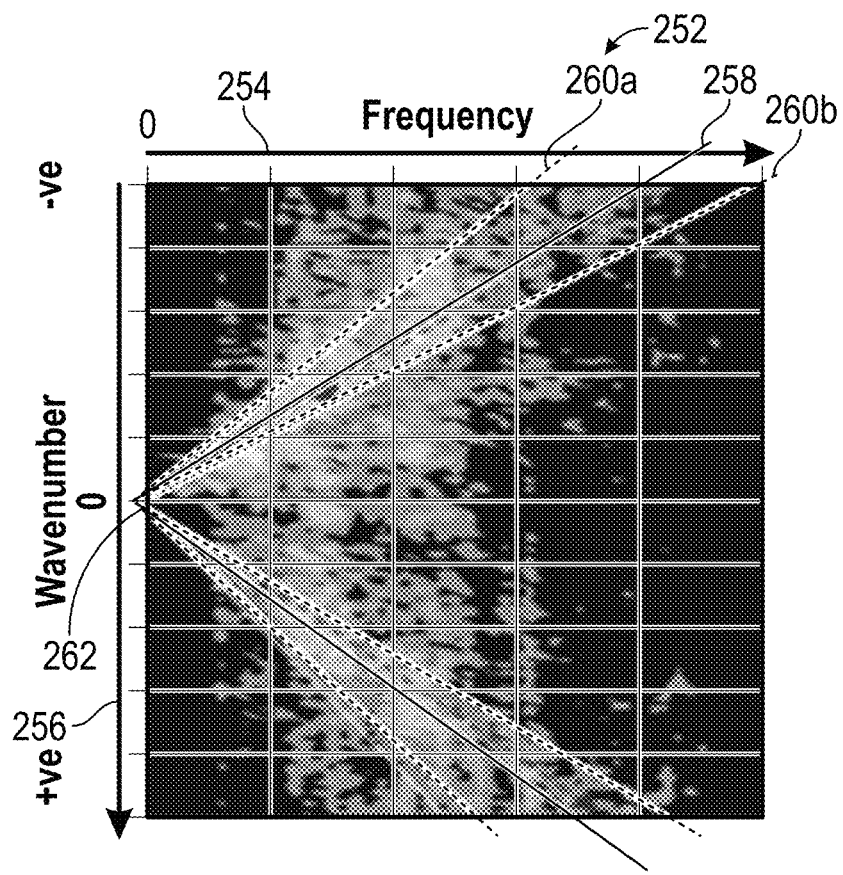
FIG. 2C shows a frequency-wavenumber domain VSP dataset in accordance with one or more embodiments.

FIG. 2C shows an amplitude spectrum (252) of the VSP dataset (250) in the frequency-wavenumber ("f-k") domain in accordance with one or more embodiments. The f-k spectrum of the VSP dataset (250) may be determined by performing by applying a Fourier transform over the time axis and over the space axis of the VSP datasets. The f-k spectrum of the VSP dataset is an array of complex numbers and the amplitude spectrum (252) may be determined by calculating the magnitude, or absolute value, of each complex number to generate an array of real numbers. The frequencies of the f-k spectrum are indicated on the horizontal axis (254) and the wavenumbers of the f-k spectrum are indicated on the vertical axis (256). In FIG. 2C positive and negative wavenumbers are shown but only positive frequencies. Lighter gray shades indicate larger amplitude values.

Signals propagating in the time-space domain (250) across FIG. 2B with a constant slope transform to straight lines (258, 260a, 260b) radiating outwards from the origin (262) in the f-k domain (252), irrespective of the their arrival time at the shallowest receiver in the time-space domain (250). Thus, a pie-shaped filter centered on a straight line (258) radiating outward from the origin (262) and bounded by the straight line (260a) and straight line (260b) may be used to isolate signals propagating in the time-space domain (250) with a constant slope irrespective of the their arrival time at the shallowest receiver in the time-space domain (250).

A person of ordinary skill in the art will readily appreciate that other transformations may be used to transform the VSP dataset from the time-space domain to the frequency-wavenumber domain. These alternatives include without limitation, a Hartley transform, a Mellin transform, and a discrete-time Fourier transform. In some embodiments, these transforms may replace the Fourier transform, in whole or in part, without departing from the scope of the invention.

Similarly, a person of ordinary skill in the art will appreciate that other transformations may be used to transform the VSP dataset into a domain where noise propagating across the time-space domain representation of the VSP dataset at a constant slope may be concentrated into a confined portion of the transform domain. For example, a tau-p transform may concentrate noise propagating with a constant slope in the time-space domain into a confined band of p values for all tau values. In these embodiments a band, rather than a pie-shaped filter may be used to isolate the noise.

Figure 3A:
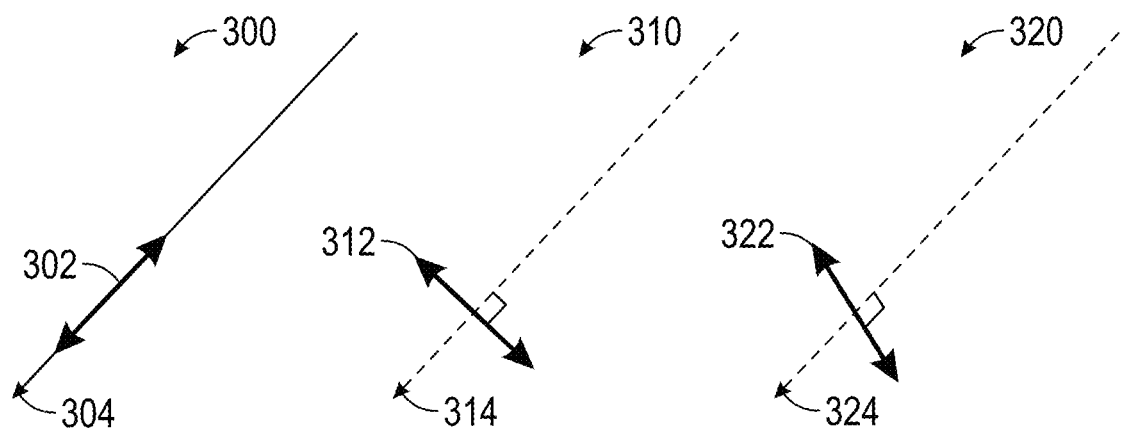
FIG. 3A depicts the polarization of seismic wave in accordance with one or more embodiments.

FIG. 3A depicts the polarization of seismic waves, in accordance with one or more embodiments. The polarization of a seismic wave is defined by the direction of vibration of the earth caused by the seismic wave. The polarization (302) of a P-wave (300) is substantially parallel the direction of propagation (304) of the P-wave (300). In an isotropic rock the polarization (302) of a P-wave (300) is parallel to the direction of propagation (304) of the P-wave (300), but in an anisotropic rock the polarization (302) of a P-wave (300) may deviate from the direction of propagation (304) of the P-wave (300). In rocks found in the earth the deviation between the polarization (304) and the propagation direction (302) of the P-wave (300) is rarely more than 10 degrees.

Two S-waves with orthogonal polarizations may propagate in the same direction in a rock. The polarization (312) of a first S-wave (310) is substantially perpendicular to the direction of propagation (314) of the first S-wave (310). In an isotropic rock the polarization (312) of the first S-wave (310) is perpendicular to the direction of propagation (314) of the first S-wave (320), but in an anisotropic rock the polarization (312) of the first S-wave (310) may deviate from the direction of propagation (314) of the first S-wave (310). In rocks found in the earth the deviation between the polarization (314) and the propagation direction (312) of the S-wave (310) is rarely more than 10 degrees.

A second S-wave (320) may propagate in a rock. The polarization (322) of the second S-wave (320) may be perpendicular to the polarization (312) of the first S-wave (310), and may be substantially perpendicular to the direction of propagation (324) of the second S-wave (320). In an isotropic rock the polarization (322) of the second S-wave (320) is perpendicular to the direction of propagation (324) of the second S-wave (322), but in an anisotropic rock the polarization (322) of the second S-wave (320) may deviate from the direction of propagation (324) of the second S-wave (320). In rocks found in the earth the deviation between the polarization (324) and the propagation direction (322) of the S-wave (320) is rarely more than 10 degrees.

Figure 3B:
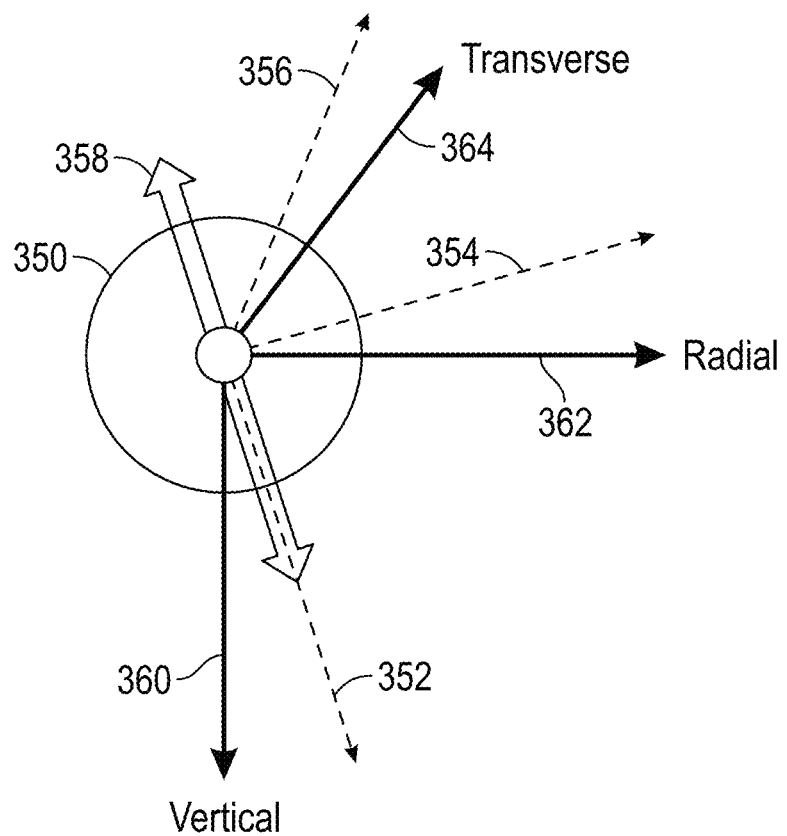
FIG. 3B depicts systems in accordance with one or more embodiments.

FIG. 3B depicts a multicomponent seismic receiver (350). In some embodiments, the multicomponent seismic receiver (350) may detect motion in two directions (352, 354), and in other embodiments the multicomponent seismic receiver (350) may detect motion in three directions (352, 354, 356). Typically, one component of motion detection is oriented parallel to the wellbore axis (538) and at least one component of motion detection is oriented perpendicular to the wellbore axis (358). When the wellbore is vertical the component of motion oriented parallel to the wellbore axis (358) may be accurately termed the vertical component (360) and the one or two components of motion oriented perpendicular to the wellbore axis (358) may be accurately termed the horizontal components.

In one or more embodiments, a multicomponent seismic receiver (350) may have two horizontal components. The horizontal component that lies in the vertical plane defined by the seismic receiver (350) location and the seismic source (102) location is frequently termed the radial component (362) and the horizontal component that lies perpendicular to the vertical plane containing the seismic receiver (350) location and the seismic source (102) location is called the transverse component (364).

In cases when the wellbore axis (358) is not vertical, or neither horizontal component is a radial component (362), a vertical component (360), a radial component (362), and a transverse component (364) may be determined using vector rotation methods well known to one of ordinary skill in the art.

Figure 4:
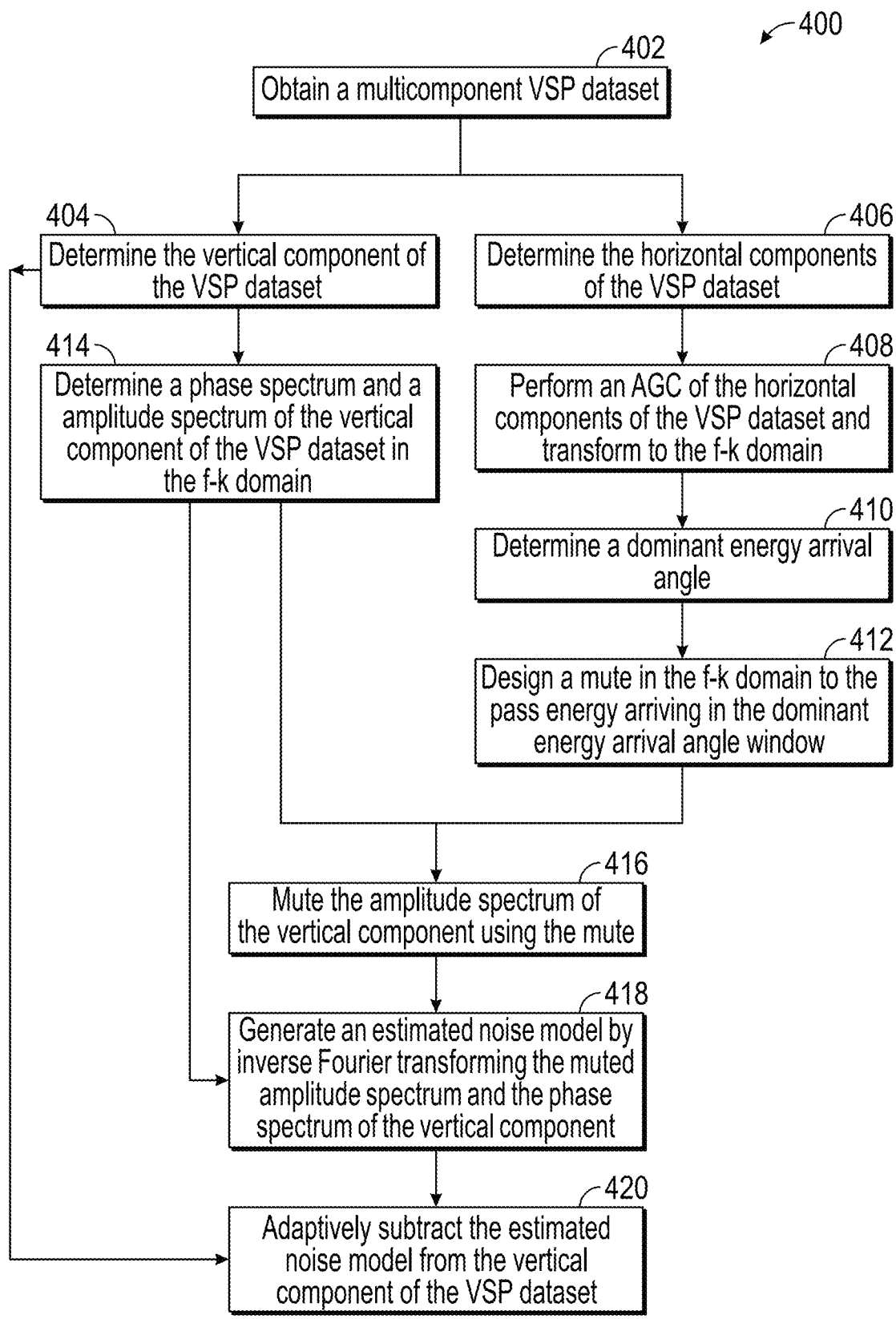
FIG. 4 shows a flowchart in accordance with one or more embodiments.

FIG. 4 shows a flowchart (400) in accordance with one or more embodiments. In Step 402 a multicomponent VSP dataset is obtained. The multicomponent VSP dataset may consist of a component parallel to the axis of the wellbore (358) and one component perpendicular to the axis of the wellbore (358), or a component parallel to the axis of the wellbore (358) and two components (354, 356) perpendicular to the axis of the wellbore (358) and perpendicular to one another. In accordance with some embodiments, the VSP dataset may be recorded on a vertical component (360), a radial component (362), and a transverse component (364). In accordance with other embodiments, the vertical component (360), radial component (362), and transverse component (364) may be obtained by vector rotation of a VSP dataset recorded using a different coordinate system.

In accordance with one or more embodiments, a vertical component dataset may be determined from the multicomponent VSP dataset in Step 404. In Step 406 a horizontal component VSP dataset (362) or two horizontal components (362, 364) VSP dataset may be determined.

In Step 408, in accordance with one or more embodiments, automatic gain control (AGC) may be applied to one or two horizontal components. AGC may be applied to the VSP dataset on a trace-by-trace basis using a sliding time window. A window with a length of $\Delta t$ is selected, and this window is progressively moved along the time axis sample-by-sample. $\Delta t$ may be called the AGC operator length. At each position of the window, a scale factor is calculated based on the amplitudes within the specified time window. This scale factor may depend on the inverse of root mean square (RMS), mean, or median amplitude value of the time window. Typically, the amplitude value at the center of the window may be multiplied by the scale factor, although in some embodiments the sample value multiplied by the scale factor may be at the beginning or end of the AGC window. This process of scale factor determination followed by multiplication of a sample value may be repeated for all samples along the trace. The overall effect of AGC is to increase the relative amplitude of small sample values and decrease the relative amplitude of large sample values.

Furthermore, in Step 408 the one or two horizontal components after the application of AGC may be transformed from the time-space domain into the frequency-wavenumber("f-k") domain. The transformation may be performed by applying a Fourier transform over both the time axis and the space axis of the horizontal component VSP datasets.

The combined horizontal f-k amplitude spectrum may be determined using:

$$A(k_r,f) = |F_k F_f F_{agc}\{r_T(x_r,t)\}| + |F_k F_f F_{agc}\{r_R(x_r,t)\}| \quad \text{Equation (1)}$$

where A is the amplitude spectrum, $k_r$ is the seismic receiver wavenumber, and f is frequency. Further, $F_{agc}$ is the AGC operator, $F_f$ is the Fourier transform operator over time, t, $F_k$ is the Fourier transform operator over the seismic receiver locations, $x_r$, and | | is the absolute value operator. $r_R$ is the radial component of the VSP dataset and $r_T$ is the transverse component of the VSP dataset.

In Step 410 a dominant energy arrival angle may be determined in the horizontal f-k amplitude spectrum, in accordance with one or more embodiments. Separate dominant energy arrival angles may be determined for positive wavenumbers (262) and for negative wavenumbers (258):

$$\theta_{max}^+ = \underset{\theta}{\operatorname{argmax}}\{F_{max}(A(k_r, k_r \tan\theta))\}, \text{ if } k_r > 0 \quad \text{Equation (2)}$$

and $$\theta_{max}^- = \underset{\theta}{\operatorname{argmax}}\{F_{max}(A(k_r, -k_r \tan\theta))\}, \text{ if } k_r < 0 \quad \text{Equation (2)}$$

where θ is the angle between the straight line (258) or the straight line (262) and the wavenumber axis (256) and $F_{max}$ is an operator that returns a maximum value of the amplitude spectrum along the straight line defined by θ. In accordance with one or more embodiments $F_{max}$ may return the maximum value of the amplitude value along the straight line. In accordance with other embodiments, $F_{max}$ may return the mean, median, or modal value along the straight line. Still other functions, familiar to one of ordinary skill in the art, may be used to determine a characteristic amplitude spectrum value along the straight line, without departing from the scope of the invention.

In Step 412, in accordance with one or more embodiments, a mute operator may be designed in the f-k domain such that energy arriving in the dominant energy arrival angle window is passed and energy lying outside the window is muted or attenuated. In accordance with some embodiments, the mute operator may be a pie-shaped operator in the f-k domain and may be centered on a dominant energy signal direction (258) and may be bounded by neighboring directions (260a, 260b). In some embodiments, the angle defining the direction (258) and the direction (260a) may be 10 degrees.

In Step 414, in accordance with one or more embodiments, a phase spectrum and an amplitude spectrum may be determined in the f-k domain from the vertical component of the VSP dataset. The determination may be based, at least in part, on a Fourier transform over both the time axis and the space axis of the vertical component VSP dataset.

In Step 416, in accordance with one or more embodiments, the mute designed in Step 412 may be applied to the amplitude spectrum of the vertical component determined in Step 414 producing, a muted amplitude spectrum.

In Step 418, the muted amplitude spectrum determined in Step 416 and the phase spectrum determined in Step 414 may be transformed into an estimated noise model. The transformation into an estimated noise model may be performed using an inverse Fourier transform over wavenumber and an inverse Fourier transform over frequency.

In Step 420, in accordance with one or more embodiments, the estimated noise model may be adaptively subtracted from the vertical component of the VSP dataset determined in Step 404. Adaptive subtraction may be performed by applying an operator, Q, to the estimated noise model, n, and subtracting the result from the vertical component of the VSP dataset:

$$s(x_s, x_r, t) = r_v(x_s, x_r, t) - Q\{n(x_s, x_r, t)\} \quad \text{Equation (3)}$$

where s is the shear-wave attenuated vertical component VSP dataset.

The adaptive subtraction operator, Q, may be determined by finding the minimum of a cost function:

$$Q = \underset{Q}{\operatorname{argmin}}\{\|r_v(x_s, x_r, t) - Q\{n(x_s, x_r, t)\}\|_\mu\} \quad \text{Equation (4)}$$

where $\|\ \|_\mu$ denotes a norm that may be an L1-norm, or an L2-norm, or any other norm familiar to one of ordinary skill in the art without departing from the scope of the invention. In accordance with one or more embodiments the adaptive subtraction operator, Q, may be a matching filter. The parameters of Q may be determined by solving equation (4).

Figure 5:
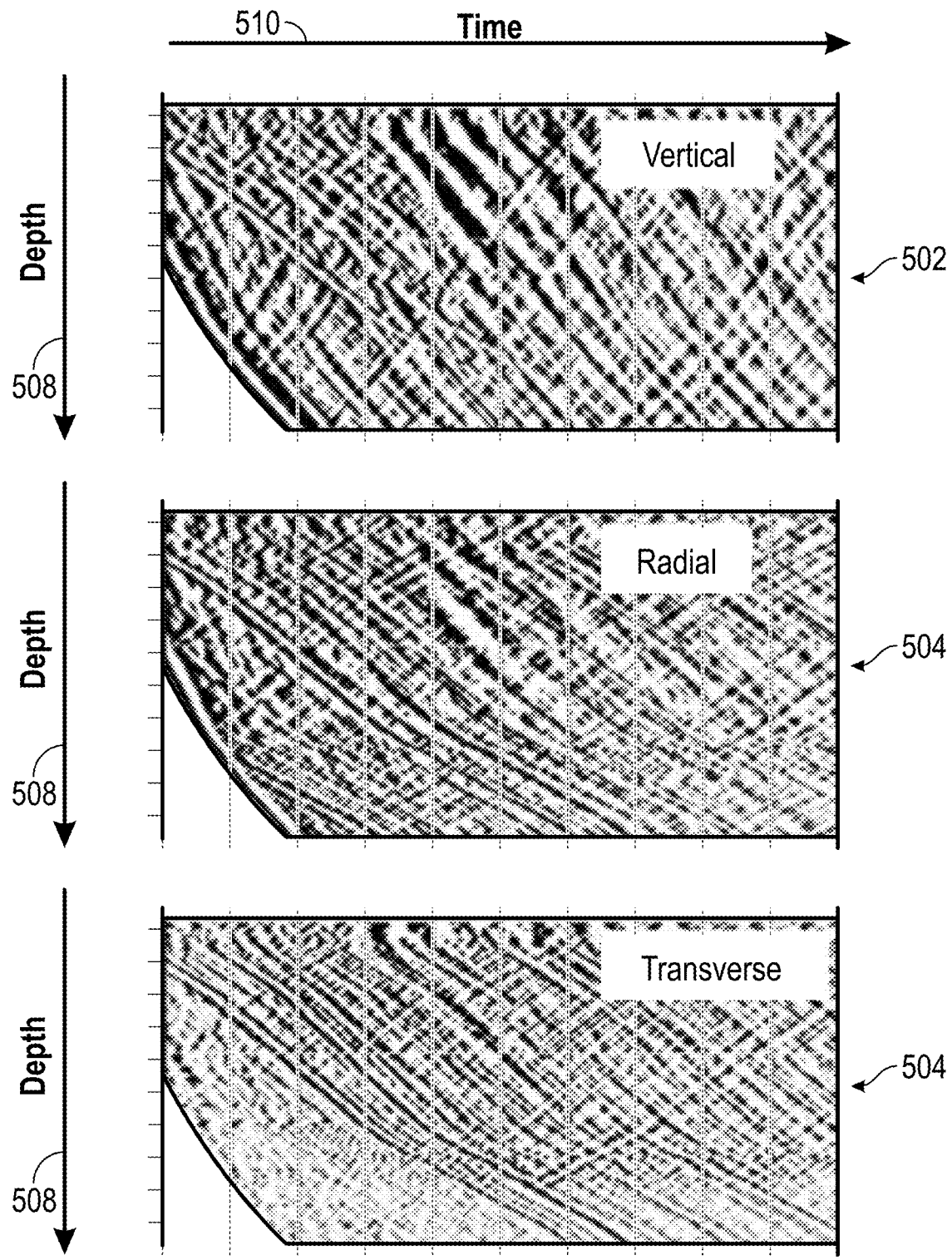
FIG. 5 shows time-space domain VSP datasets in accordance with one or more embodiments.

FIGS. 5-8 illustrate the application of the steps described in flowchart (400) to a multicomponent VSP dataset. FIG. 5 shows a three component VSP dataset with the vertical component (502), the radial component (504) and the transverse component (506) each displayed separately as a function of depth indicated on the vertical axis (508) and recording time indicated on the horizontal axis (510).

Figure 6:
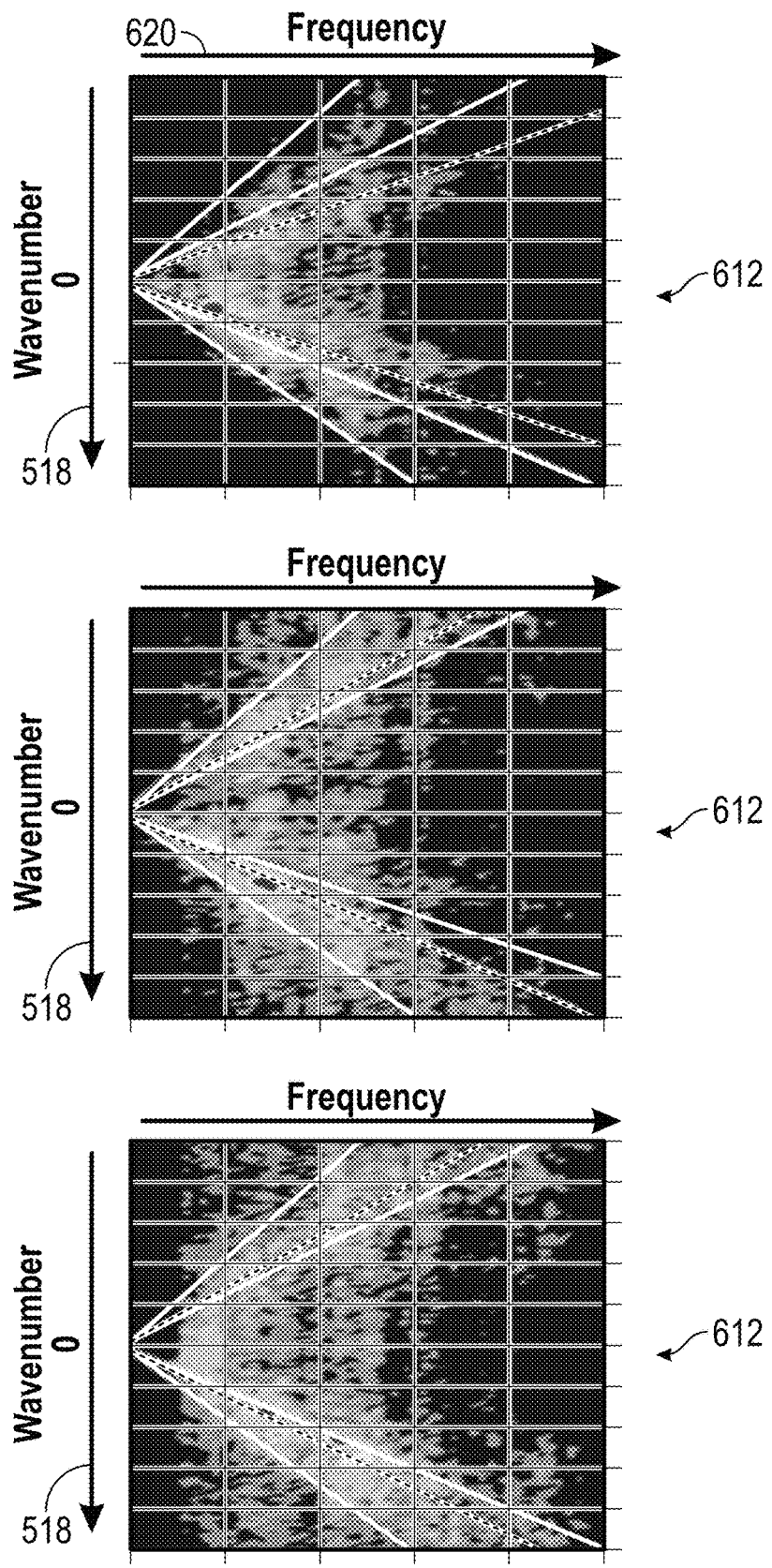
FIG. 6 shows frequency-wavenumber domain VSP datasets in accordance with one or more embodiments.

FIG. 6 shows a f-k spectrum of each component VSP dataset with the vertical component (612), the radial component (614) and the transverse component (616) each displayed separately as a function of wavenumber indicated on the vertical axis (518) and frequency indicated on the horizontal axis (620).

Figure 7:
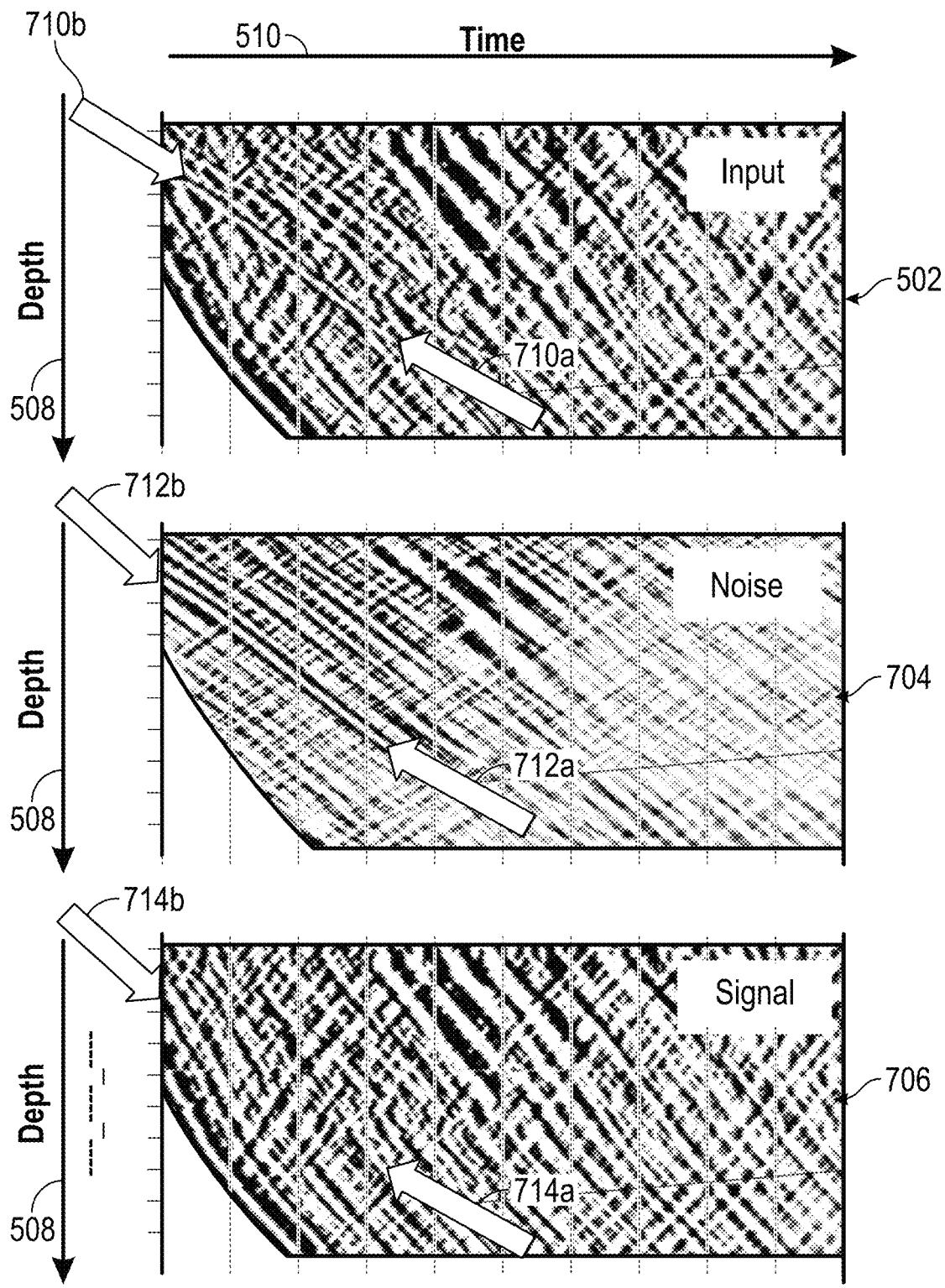
FIG. 7 shows time-space domain VSP datasets in accordance with one or more embodiments.
Figure 8:
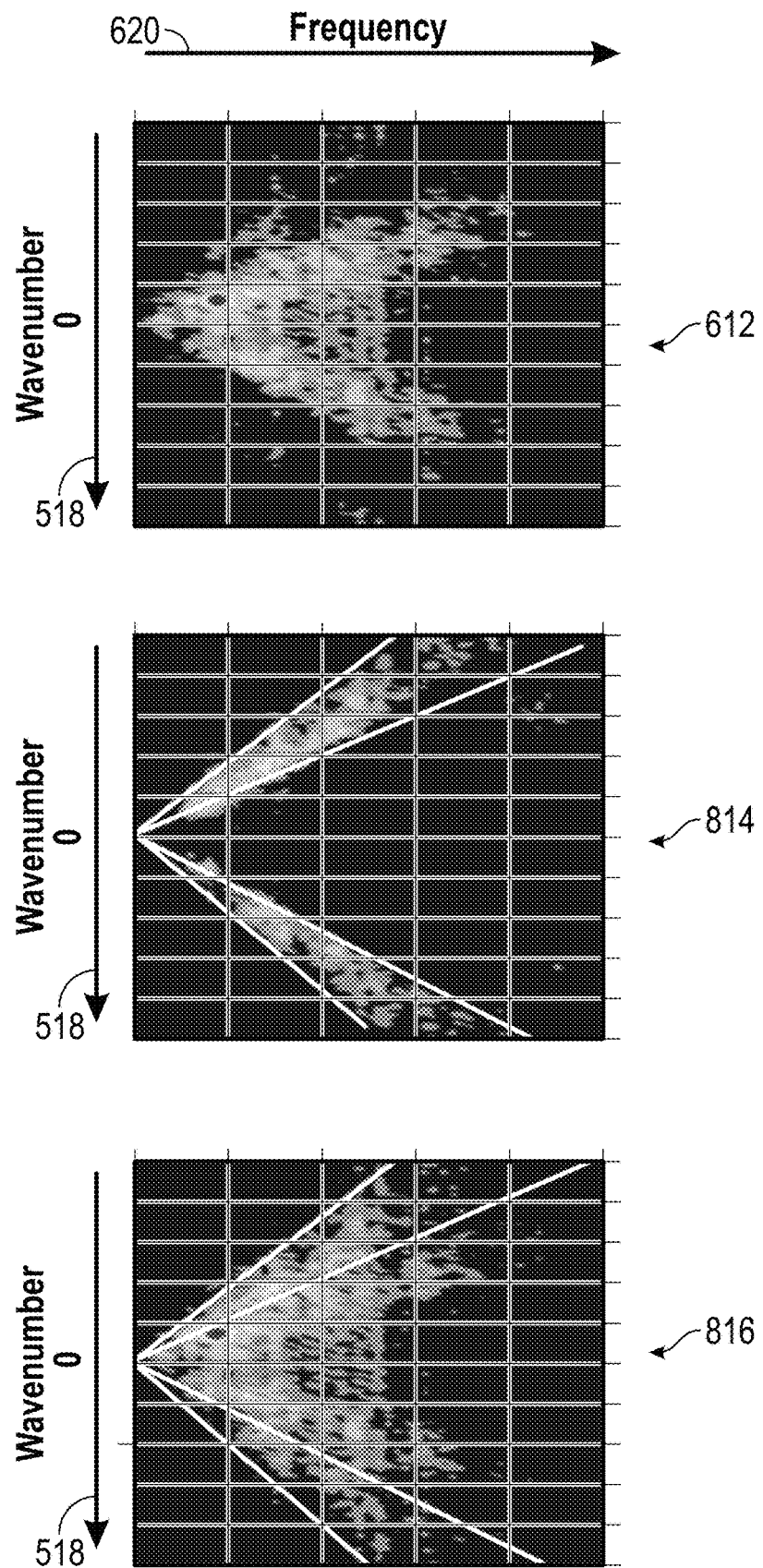
FIG. 8 shows frequency-wavenumber domain VSP datasets in accordance with one or more embodiments.

FIG. 7 shows the input vertical component (502), the estimated noise model (704) and the shear-wave attenuated vertical component VSP dataset (706) each displayed separately as a function of depth indicated on the vertical axis (508) and recording time indicated on the horizontal axis (510). FIG. 7 further shows arrows (710a, 710b) indicating an illustrative shear wave arrival on the vertical component of the VSP dataset (502). Arrows (712a, 712b) show a corresponding shear wave arrival determined in the estimated noise model (704) and arrows (714a, 714b) indicate the absence of the shear wave arrival in the shear-wave attenuated vertical component (706) produced by adaptively subtracting the estimated noise model (704) from the input vertical component (502).

FIG. 6 shows a f-k spectrum of the vertical component VSP dataset (612), the f-k spectrum of the estimated noise model (814) and the f-k spectrum of the shear-wave attenuated vertical component (816) each displayed separately as a function of wavenumber indicated on the vertical axis (518) and frequency indicated on the horizontal axis (620). f-k spectrum (814) illustrates how the f-k spectrum of the estimate noise models only has non-negligible components passed by the regions defined by the pie-shaped mute filter.

In accordance with one or more embodiments, the shear-wave attenuated vertical component (706) may be used to determine a seismic image of a hydrocarbon reservoir in the vicinity of the wellbore. The seismic image may be determined by any seismic imaging method familiar to one of ordinary skill in the art, such as Kirchhoff migration, Reverse Time migration or Least-Squares migration, without departing from the scope of the invention. In accordance with other embodiments, the shear-wave attenuated vertical component (706) may be used to convert surface seismic datasets from the time domain to the depth domain, or to correct the depth axis of depth domain surface seismic datasets.

Furthermore, a wellbore path may be planned and drilled, based at least in part, on the seismic image of the hydrocarbon reservoir to produce hydrocarbons from the hydrocarbon reservoir. The wellbore path may be an extension of wellbore (108), or a sidetrack wellbore deviating from wellbore (108) at a depth less than the maximum depth of wellbore (108), or the wellbore may be a new wellbore drilled from the earth's surface (104).

Figure 9:
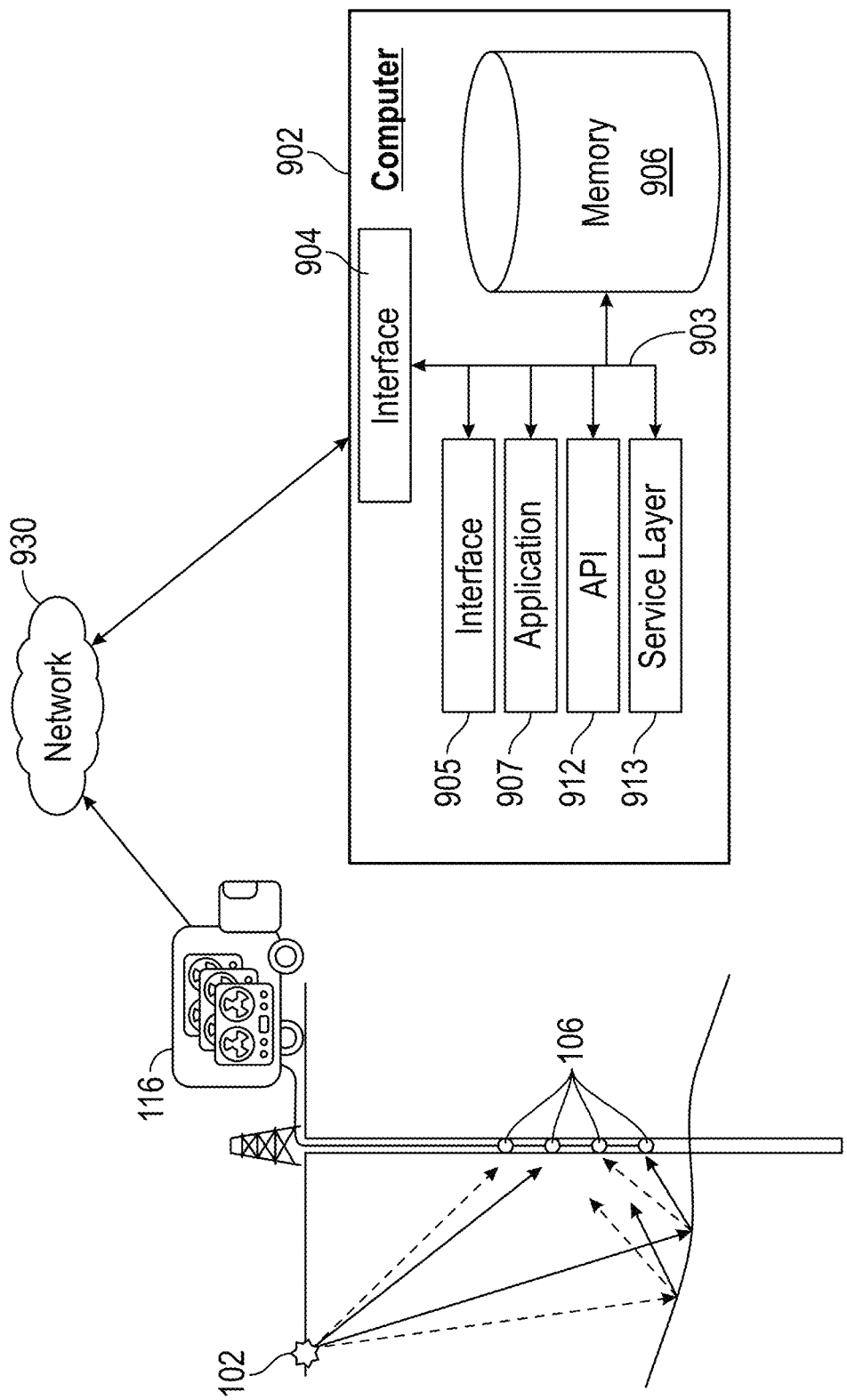
FIG. 9 shows a system in accordance with one or more embodiments.

FIG. 9 shows a system in accordance with one or more embodiments. The system may include a seismic source (102), and a plurality of multi-component borehole seismic receivers (106) for detecting a seismic wave generated by the seismic source. The system may further include a seismic recording facility (116) for recording the detected seismic waves and a seismic processor that may be located in the seismic recording facility or may be located at a location remote from the wellbore and connected to the seismic recording facility by a network (930). The seismic processor may be a computer system configured to process a VSP dataset to determine a shear-wave attenuated vertical component VSP dataset (706).

FIG. 9 further depicts a block diagram of the computer system (902) used to provide computational functionalities associated with described algorithms, methods, functions, processes, flows, and procedures as described in this disclosure, according to one or more embodiments. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a Graphical User Interface (GUI).

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904 includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of determining a shear-wave attenuated vertical component vertical seismic profile (VSP) dataset, comprising:
   obtaining a multi-component VSP dataset, wherein the multi-component VSP dataset comprises a vertical component and a horizontal component;
   transforming, using a computer processor, the vertical component into a vertical spectrum and the horizontal component into a horizontal spectrum;
   providing a band-pass filter based, at least in part, on an energy signal of the horizontal spectrum;
   determining, using the computer processor, a muted vertical amplitude spectrum by applying the band-pass filter to an amplitude spectrum of the vertical spectrum;
   determining, using the computer processor, an estimated noise model based, at least in part, on the muted vertical amplitude spectrum and the vertical spectrum; and
   determining, using the computer processor, the shear-wave attenuated vertical component VSP dataset by adaptively subtracting the estimated noise model from the vertical component of the multi-component VSP dataset.

2. The method of claim 1, further comprising:
   generating a seismic image of a hydrocarbon reservoir based, at least in part, on the shear-wave attenuated vertical component VSP dataset; and
   planning a wellbore trajectory to penetrate the hydrocarbon reservoir based, at least in part, on the seismic image.

3. The method of claim 1, wherein the horizontal component comprises a radial component and a transverse component.

4. The method of claim 1, wherein the vertical spectrum and the horizontal spectrum are frequency-wavenumber spectra.

5. The method of claim 1, wherein transforming the vertical component into the vertical spectrum and the horizontal component into the horizontal spectrum comprises using a two-dimensional Fourier transform from a time-space domain to a frequency-wavenumber domain.

6. The method of claim 1, wherein determining the estimated noise model comprises performing an inverse two-dimensional Fourier transform of the muted vertical amplitude and a phase spectrum of the vertical spectrum from a frequency-wavenumber domain to a time-space domain.

7. The method of claim 1, wherein designing the band-pass filter comprises determining a pie-shaped bandpass filter in a frequency wavenumber domain.

8. A non-transitory computer readable medium storing instructions executable by a computer processor, the instructions comprising functionality for:
   obtaining a multi-component VSP dataset, wherein the multi-component VSP dataset comprises a vertical component and a horizontal component;
   transforming, using a computer processor, the vertical component into a vertical spectrum and the horizontal component into a horizontal spectrum;
   providing a band-pass filter based, at least in part, on an energy signal of the horizontal spectrum;
   determining, using the computer processor, a muted vertical amplitude spectrum by applying the band-pass filter to an amplitude spectrum of the vertical spectrum;
   determining, using the computer processor, an estimated noise model based, at least in part, on the muted vertical amplitude spectrum and the vertical spectrum; and
   determining, using the computer processor, the shear-wave attenuated vertical component VSP dataset by adaptively subtracting the estimated noise model from the vertical component of the multi-component VSP dataset.

9. The non-transitory computer readable medium of claim 8, the instructions comprising functionality for:
   generating a seismic image of a hydrocarbon reservoir based, at least in part, on the shear-wave attenuated vertical component VSP dataset; and
   planning a wellbore trajectory to penetrate the hydrocarbon reservoir based, at least in part, on the seismic image.

10. The non-transitory computer readable medium of claim 8, wherein the horizontal component comprises a radial component and a transverse component.

11. The non-transitory computer readable medium of claim 8, wherein the vertical spectrum and the horizontal spectrum are frequency-wavenumber spectra.

12. The non-transitory computer readable medium of claim 8, wherein transforming the vertical component into the vertical spectrum and the horizontal component into the horizontal spectrum comprises using a two-dimensional Fourier transform from a time-space domain to a frequency-wavenumber domain.

13. The non-transitory computer readable medium of claim 8, wherein determining the estimated noise model comprises performing an inverse two-dimensional Fourier transform of the muted vertical amplitude and a phase spectrum of the vertical spectrum from a frequency-wavenumber domain to a time-space domain.

14. The non-transitory computer readable medium of claim 8, wherein designing the band-pass filter comprises determining a pie-shaped bandpass filter in a frequency wavenumber domain.

15. A system comprising:
a seismic source;
a plurality of multicomponent borehole seismic receivers for detecting a seismic wave generated by the seismic source; and
a seismic processor configured to:
obtain a multi-component VSP dataset, wherein the multi-component VSP dataset comprises a vertical component and a horizontal component;
transform the vertical component into a vertical spectrum and the horizontal component into a horizontal spectrum;
provide a band-pass filter based, at least in part, on an energy signal of the horizontal spectrum;
determine a muted vertical amplitude spectrum by applying the band-pass filter to an amplitude spectrum of the vertical spectrum;
determine an estimated noise model based, at least in part, on the muted vertical amplitude spectrum and the vertical spectrum; and
determine the shear-wave attenuated vertical component VSP dataset by adaptively subtracting the estimated noise model from the vertical component of the multi-component VSP dataset.

16. The system of claim 15, wherein the horizontal component comprises a radial component and a transverse component.

17. The system of claim 15, wherein the vertical spectrum and the horizontal spectrum are frequency-wavenumber spectra.

18. The system of claim 15, wherein transforming the vertical component into the vertical spectrum and the horizontal component into the horizontal spectrum comprises using a two-dimensional Fourier transform from a time-space domain to a frequency-wavenumber domain.

19. The system of claim 15, wherein determining the estimated noise model comprises performing an inverse two-dimensional Fourier transform of the muted vertical amplitude and a phase spectrum of the vertical spectrum from a frequency-wavenumber domain to a time-space domain.

20. The system of claim 15, wherein designing the band-pass filter based, at least in part, on an energetic signal of the horizontal spectrum comprises determining a pie-shaped band-pass filter in the frequency wavenumber domain.

* * * * *